United States Patent [19]

Weber et al.

[11] Patent Number: 5,464,880

[45] Date of Patent: Nov. 7, 1995

[54] PROCESS FOR THE CFC-FREE PRODUCTION OF CELLULAR POLYURETHANE MOLDED PARTS

[75] Inventors: Hans G. Weber, Duderstadt; Peter Haas, Haan; Erhard Michels, Köln; Christian Weber, Leverkusen; Klaus Brecht, Kürten, all of Germany

[73] Assignee: Bayer Aktiengesellschaft, Leverkusen, Germany

[21] Appl. No.: 332,676

[22] Filed: Oct. 31, 1994

[30] Foreign Application Priority Data

Nov. 4, 1993 [DE] Germany ............... 43 37 569.3

[51] Int. Cl.[6] ............................................. C08J 9/34
[52] U.S. Cl. ............................ 521/51; 521/128; 521/130; 521/164; 521/172; 521/174
[58] Field of Search .................................. 521/128, 130, 521/164, 172, 174, 51

[56] References Cited

U.S. PATENT DOCUMENTS 4,500,656  2/1985  Rasshofer et al. .................. 521/164

Primary Examiner—Morton Foelak
Attorney, Agent, or Firm—Joseph C. Gil; N. Denise Brown

[57] ABSTRACT

A process for the CFC-free production of cellular polyurethane molded parts/articles with solid surfaces by reacting a reaction mixture of per se known starting materials in sealed molds, to yield polyurethane foams. Carbamates obtainable from aliphatic aminoalcohols and carbon dioxide are used as blowing agents, optionally in conjunction with other blowing agents. The process is suitable for producing foam coverings on steering wheels, spoilers and protective upholstery in car interiors, and for producing soles of shoes or shoe components.

5 Claims, No Drawings

PROCESS FOR THE CFC-FREE PRODUCTION OF CELLULAR POLYURETHANE MOLDED PARTS

BACKGROUND OF THE INVENTION

The invention relates to a process for preparing cellular polyurethane molded parts with solid surfaces, in which a combination of CFC blowing agents and of HCFC blowing agents is not used. Nevertheless, this process results in molded items having the same shrinkage as molded parts prepared using the CFC and/or HCFC blowing agents, at the same hardness.

To prepare polyurethane foams, apart from water, fluorochlorocarbons (CFCs) or hydrofluorochlorocarbons (HCFCs) in particular have previously been used as blowing agents. The HCFC type blowing agents have previously been virtually exclusively used for the preparation of semi-rigid molded parts/articles from polyurethane foam with a solid surface, such as, e.g. for covering steering wheels or as soles for shoes. The semi-rigid foams produced using these blowing agents shrink by about 1.5%, which must be taken into account when constructing the mold. The molds used in practice have been designed correspondingly larger due to this approximately constant value for shrinkage of 1.5%, in order to achieve the actual dimensions required after the predicted shrinkage has occurred.

Due to the known ecological problems connected with the halogen-containing blowing agents mentioned, there is a great deal of interest in new kinds of reactive systems which react to give semi-rigid polyurethane foams with solid surfaces and which do not contain halogen-containing blowing agents. It is desired that these foams with solid surfaces exhibit the advantages which are normally associated with the use of these blowing agents, without being tainted by the disadvantages, especially from the ecological point of view. The blowing agents in these new kinds of reactive systems are intended not only to enable the production of molding foams with solid surfaces, but also to result in molded articles whose shrinkage at the same hardness corresponds to the shrinkage of polyurethane foams prepared using the halogen-containing blowing agents. In fact, the molds which have been used up to the present time can only continue to be used if this requirement is met.

The use of water as the only blowing agent does not solve the problems mentioned above. In particular, this is because (i) the decrease in pressure in the foam takes place much more slowly using water than when using known halogen-containing blowing agents, so that at the conventional short molding times used for mass production, molded articles are produced which tend to crack easily, (ii) the elasticity of the resulting molded article (especially for soles of shoes) is not sufficient for the requirements met in practice, and, especially, (iii) the resulting molded articles have a shrinkage of only 0.5% so that the molds previously used would become useless.

The equally obvious idea of using hydrocarbons such as, for example, isomeric pentanes or cyclopentane, has, in particular, the problem of the high flammability of these substances.

It has now been found that specific carbamates, of the type described in more detail below, represent blowing agents which correspond to all the above mentioned prerequisites. In particular, these enable the production of semi-rigid polyurethane foams with solid surfaces, whose shrinkage at comparable hardness corresponds to the shrinkage of the foams previously produced using halogen-containing blowing agents.

Although EP 0,121,850 already describes, inter alia, the use of carbamates of the now recommended type as blowing agents for polyurethane foams. However, it is clear from the working examples that it is preferred that these type of blowing agents be used in combination with other blowing agents. The prior publication, however, does not disclose or suggest that carbamates also enable the production of polyurethane foams with solid surfaces, or the molding foams produced in this way have a shrinkage behavior which corresponds to that of the molding foams in accordance with the prior art as discussed above.

DESCRIPTION OF THE INVENTION

This invention provides a process for the CFC-free production of cellular polyurethane molded pads having solid surfaces. These molded parts are produced by reacting, in closed molds, a reaction mixture of per se known reactants, allowing the reaction mixture to fully react, and removing the molded part from the mold. The reaction mixture comprises:

A) a polyisocyanate component with an NCO content of 18 to 33.6% comprising at least one, optionally chemically modified, polyisocyanate or polyisocyanate mixture from the diphenylmethane series, B) a polyol component having an average hydroxyl functionality of 2 to 3, and comprising at least one polyether polyol having a molecular weight of 2,000 to 10,000, and/or at least one polyester polyol having a molecular weight of 2,000 to 10,000, C) from 2 to 15% by weight, based on the weight of component B), of at least one difunctional compound having a molecular weight range of 62 to 1999, and D) blowing agents and other auxiliary substances and additives known per se in the field of polyurethane chemistry.

In particular, the blowing agents comprise carbamates which are selected from the group of carbamates corresponding to the general formula:

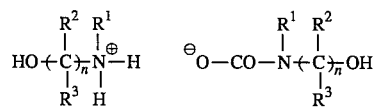

wherein:

$R^1$ represents hydrogen, a $C_1$–$C_5$ alkyl group or a group of the formula:

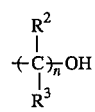

$R^2$ and $R^3$ may be identical or different, and represent hydrogen or $C_1$–$C_3$ alkyl groups, and n is an integer from 2 to 6.

It is possible to use these carbamate type blowing agents in combination with other halogen-free blowing agents.

The polyisocyanate component A) has an NCO content of 18 to 33.6 wt. %, preferably 20 to 30 wt. %, and is preferably liquid at 20° C. It comprises at least one polyisocyanate from the diphenylmethane series. The polyisocyanate may optionally be chemically modified. By the phrase "diphenylmethane series", it is meant to include, in particular, 4,4'-diisocyanato-diphenylmethane, its industrial mixtures with 2,4'-diisocyanato-diphenylmethane and optionally 2,2'-diisocyanatodiphenylmethane, and mixtures of these diisocyanates with their higher homologues, such as those which are produced during the phosgenation of aniline/formaldehyde condensates, and/or during the distillative working up of this type of phosgenation product. "Chemical modification" of these polyisocyanates means, in particular, urethane modification which is known per se, for example, by reacting up to 30 equivalent percent of the NCO groups which are present with polypropylene glycols having a maximum molecular weight of 700, or the per se known carbodiimidization of up to 30% of the NCO groups which are present.

Component B) has a mean hydroxyl functionality of 2 to 3 and consists of at least one polyhydroxypolyether with a molecular weight range of 2,000 to 10,000, preferably 3,000 to 6,000, and/or at least one polyhydroxypolyester with a molecular weight of 2,000 to 10,000, preferably 2,000 to 4,000. This data with regard to molecular weight relates to the molecular weight which can be calculated from the OH functionality and the OH content in known manner by those of ordinary skill in the art.

Suitable polyhydroxypolyethers include alkoxylation products of preferably di- or tri-functional starter molecules, or mixtures of this type of starter molecule, which are known per se from polyurethane chemistry. Suitable starter molecules include, for example, water, ethylene glycol, diethylene glycol, propylene glycol, trimethylolpropane or glycerol. Alkylene oxides used for alkoxylation are in particular propylene oxide and ethylene oxide, wherein these alkylene oxides can be used in any sequence and/or as a mixture.

Suitable polyesterpolyols include esterification products, which are known per se and which contain hydroxyl groups, of preferably dihydric alcohols and less than equivalent amounts of preferably difunctional carboxylic acids. Suitable dihydric alcohols include compounds such as, for example, ethylene glycol, propylene glycol, neopentyl glycol, 1,4-butanediol, 1,6-hexanediol. Examples of difunctional carboxylic acids include compounds such as succinic acid, adipic acid, phthalic acid, tetrahydrophthalic acid, hexahydrophthalic acid, or mixtures of this type of acid.

Component C) is a difunctional chain-extending agent with a molecular weight range of 62 to 1999, preferably 62 to 400. The term "difunctional" refers to the functionality of the chain extending agent with respect to the isocyanate polyaddition reaction. If there are no specific compounds used as chain extending agents, the data with regard to molecular weight also refers to the value calculated from the OH functionality and OH content.

Included among preferred chain-lengthening agents are simple dihydric alcohols which have molecular weights of less than 200 such as, for example, ethylene glycol, 1,4-butanediol, 1,6-hexanediol, or mixtures of this type of simple diol. Also, compounds suitable as component C) or as part of component C), are, for example, diols which have ether groups, whose molecular weights correspond to the data set forth above, such as those which are obtainable by propoxylation and/or ethoxylation of dihydric starter molecules of the type already mentioned above by way of example.

Other suitable compounds to be used as chain-extending agents include, for example, aromatic diamines with sterically hindered amino groups such as, for example, 1-methyl-3,5-diethyl-2,4-diaminobenzene and its industrial mixtures with 1-methyl-3,5-diethyl-2,6-diaminobenzene (DETDA). Any mixtures of the chain-extending agents mentioned by way of example may also be used. These chain-extending agents are generally used in amounts of 2 to 15% by weight, preferably 4 to 12% by weight, based on the weight of component B).

The auxiliary substances and additives D) used in the present invention include, specifically, the carbamates used as blowing agents and which are essential according to the invention, and the various other kinds of additives of the type known per se to those skilled in the art.

Carbamates which are essential according to the invention include those compounds which correspond to the general formula set forth above. The variables $R^1$, $R^2$, $R^3$ and n also have the meaning given above.

It is preferred that the carbamates corresponding to the general formula above are those in which $R^1$ represents hydrogen, a methyl group or a group of the formula

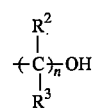

and particularly preferably represents hydrogen, $R^2$ represents hydrogen, $R^3$ represents hydrogen or a methyl group, and n represents 2; or if $R^2=R^3=H$, then n represents 2 or 3.

Generally, these carbamates can be prepared by the simple saturation of basic alkanolamines corresponding to the formula:

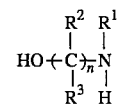

with gaseous or solid carbon dioxide at temperatures between 40° and 130° C.

Particularly preferred alkanolamines for preparing the carbamates include, for example, ethanolamine, isopropanolamine, 3-aminopropanol-1, N-methylethanolamine, or mixtures of this type of alkanolamine.

When performing the process according to the invention, the carbamate used as a blowing agent is generally used in an amount of 0.1 to 6% by weight, preferably 0.5 to 5% by weight, based on the weight of component B).

In addition, further, optional, jointly used auxiliary substances and additives D) include those which are conventional in the production of polyurethane foams such as, for example, activators, stabilizers, and other halogen-free blowing agents including, in particular, water, which is optionally used in an amount of up to 0.3% by weight, based on the weight of component B). Preferably, the process according to the invention is performed without water.

The starting components of the reaction are present in amounts so as to correspond to an Isocyanate Index of 80 to 120, preferably 95 to 105. The phrase "isocyanate Index" (also commonly referred to as NCO index), is defined herein as the equivalents of isocyanate, divided by the total equivalents of isocyanate-reactive hydrogen containing materials, multiplied by 100.

To perform the process according to the invention, components B) to D) are generally combined to give a "polyol component" which is then mixed with the polyisocyanate component A), allowed to react in sealed molds, and removing the produced part. In this case, conventional measuring and metering devices are used.

Molds which are used include, for example, shoe-sole or shoe component molds (i.e. those for producing soles of shoes or shoe components by the casting or direct soling process), steering wheel or spoiler molds or molds for protective upholstery for car interiors, wherein the internal walls of the mold are generally coated with conventional mold release agents prior to filling.

The temperature of the reactive components (polyisocyanate component A) and polyol component B)) is generally in the range 20° to 45° C. The temperature of the mold generally ranges from 20° to 70° C.

The amount of expandable material introduced into the mold is selected so that molded parts/articles having densities of 200 to 700 kg/m$^3$ result.

The products from the process according to the invention are semi-rigid polyurethane foams with solid surfaces in the Shore A hardness range of 20 to 70. The shrinkage of these molded items varies between 1.2 and 1.8%, and corresponds, in general, to the shrinkage of analogous molded items produced using CFC or HCFC blowing agents.

The invention is further illustrated but is not intended to be limited by the following examples in which all parts and percentages are by weight unless otherwise specified. However, all percentage data relating to shrinkage do not refer to weight.

EXAMPLES

| Starting materials | |
|---|---|
| Polyisocyanate I: | an isocyanate having an NCO content of 23%, and prepared by the liquefication of 4,4'-diphenylmethane diisocyanate with tripropylene glycol. |
| Polyisocyanate II: 20.2% prepared | an NCO prepolymer having an NCO content of by reacting: (I) 56 parts by wt. of 4,4'-diisocyanato-diphenylmethane (4,4'-MDI), and 1 part by wt. of a modified 4,4'-MDI having an NCO content of 30%, prepared by partial carbodiimidization of the NCO groups; with (II) a mixture of 21 parts by wt. of polypropylene glycol having an OH value of 56, and 6.7 parts by wt. of tripropylene glycol. |
| Polyisogyanate III: | a polyisocyanate mixture having an NCO content of 28% and a viscosity (at 25° C.) of 130 mPa·s, consisting of equal parts by weight of: (I) a polyisocyanate having an NCO content of 24.5% and a viscosity (at 25° C.) of 500 mPa·s, which was prepared by phosgenation of an aniline/formaldehyde condensate to yield a phosgenation product having an NCO content of 31,5% and subsequent reaction of the phosgenation product with polypropylene glycol having an OH value of 515; with (II) a polyisocyanate mixture from the diphenylmethane series having an NCO content of 31.5% and containing 60% of diisocyanato-diphenylmethane isomers (94% 4,4'-, 5% 2,4'- and 1% 2,2'-isomer) and 40% of homologues with more aromatic rings. |
| Polyol 1: | a polyether diol having a molecular weight of 4,000, prepared by the propoxylation of propylene glycol and subsequent ethoxylation of the propoxylation product (ratio by weight PO:EO = 70:30). |
| Polyol II: | a polyether triol having a molecular weight bf 6200, prepared by the propoxylation of trimethylolpropane and subsequent ethoxylation of the propoxylation product (ratio by weight PO:EO = 80:20). |
| Polyol III: | a polyether triol having-a molecular weight of 4800, prepared by the propoxylation of trimethylolpropane and subsequent ethoxylation of the propoxylation product (ratio by weight PO:EO = 85:15). |
| Polyol IV: | a polyether triol grafted with 20% by weight, based on the total weight of the polyol, of styrene/acrylonitrile (ratio by weight = 40:60), and prepared by propoxylation of trimethylolpropane and subsequent ethoxylation of the propoxylation product (ratio by weight PO:EO = 85:15), the molecular weight of the grafted polyether being 6,000. |
| Carbamate I: | $CO_2$ is passed into 750 g (10 mol) of 3-amino-propanol until it is saturated, wherein ca. 5 mol had been absorbed. Analysis for $C_7H_{18}N_2O_4$ (194): calc: C: 43.2%, H: 9.2%, N: 14.4% found: C: 43.1%, H: 9.1%, N: 14.8% Viscosity: 45,000 mPa·s (25° C.) |
| Carbamate II: | $CO_2$ is passed into 610 g (10 mol) of aminoethanol |

| Starting materials | |
|---|---|
| | until it is saturated, wherein ca. 5 mol had been absorbed.<br>Analysis for $C_5H_{14}N_2O_4$ (166):<br>calc:     C: 36.1%, H: 9.4%, N: 16.8%<br>found:   C: 35.9%, H: 8.6%, N: 17.0%<br>Viscosity: 22,000 mPa·s (25° C.) |
| Carbamate III: | $CO_2$ is passed into 750 g (10 mol) of N-methyl-ethanolamine until it is saturated, wherein ca. 5 mol had been absorbed.<br>Analysis for $C_7H_{18}N_2O_4$ (194):<br>calc:     C: 43.2%, H: 9.2%, N: 14.4%<br>found:   C: 43.0%, H: 8.8%, N: 14.7%<br>The carbamate solidified as crystals; F.pt: 50° C. |
| Carbamate IV: | $CO_2$ is passed into 750 g (10 mol) of isopropanol-amine until it is saturated, wherein almost 5 mol had been absorbed.<br>Analysis for $C_7H_{18}N_2O_4$ (194):<br>calc:     C: 43.2%, H: 9.2%. N: 14.4%<br>found:   C: 42.9%, H: 8.8%, N: 14.9%<br>Viscosity: 150,000 mPa·s (25° C.) |

In all the examples, an NCO index of 100 was maintained.

EXAMPLE 1

An expandable mixture of the following composition was introduced into a shoe sole mold for a standard shoe size of 8½, via a low pressure metering device with a stirrer which is conventional for the production of shoe soles, provided by the Elastogran Maschinenbau Co., in an amount such that a molded part having a density of 550 kg/m³ is produced. Mold temperature: 45° C., raw materials temperature: 25° C., molding time: 4 min.

The internal walls of the mold were sprayed with a commercial mold release agent (Keck-Öko-65 A available from J. Keck, Pirmasens).

The following formulation was used:

| Polyol component: | |
|---|---|
| Polyol I | 78.6 parts by wt. |
| Polyol II | 10.0 parts by wt. |
| Butanediol-1,4 | 10.0 parts by wt. |
| Triethylenediamine | 0.3 parts by wt. |
| Dibutyltin dilaurate (DBTL) | 0.02 parts by wt. |
| Carbamate IV | 1.0 parts by wt. |
| Polyisocyanate component: | |
| Polyisocyanate I | 56.0 parts by wt. |
| Properties: | |
| Density | 550 kg/m³ |
| Longitudinal shrinkage (%) after 2 days | 1.5 |
| Hardness (Shore A) | 58 |
| Flow behavior | very good |

EXAMPLE 2 (COMPARISON)

In the following example, an analogous foam, corresponding to example 1, was prepared using a difluorochloromethane (i.e. R22) blowing agent instead of the carbamate blowing agent. The variation in the formulation of starting materials corresponded to the comparison striven for with respect to shrinkage at the same hardness.

| Polyol component: | |
|---|---|
| Polyol I | 78.6 parts by wt. |
| Polyol II | 10.0 parts by wt. |
| Butanediol-1,4 | 8.5 parts by wt. |
| Triethylenediamine | 0.45 parts by wt. |
| Dibutyltin dilaurate (DBTL) | 0.02 parts by wt. |
| R22 | 2.5 parts by wt. |
| Polyisocyanate component: | |
| Polyisocyanate I | 44 parts by wt. |
| Properties: | |
| Density | 550 kg/m³ |
| Longitudinal shrinkage (%) after 2 days | 1.5 |
| Hardness (Shore A) | 58 |
| Flow behavior | good |

The same shrinkage is achieved with 5.5 parts by wt. of R11 (monofluorotrichloromethane) at the same density.

Repeating Example 1 using the same parts by weight of carbamates I to III instead of carbamate IV led to virtually identical results as in Example 1 with respect to shrinkage and mechanical properties. In the following comparison example, the production of a largely analogous molding foam of the same hardness is described but with the exclusive use of water as the blowing agent. Since the use of water as a blowing agent generally leads to embrittlement of the foam, due to the high concentration of urea groups, Polyisocyanate I is simultaneously replaced by Polyisocyanate II, which has an elasticizing effect, in order to compensate for this effect.

The following formulation was used:

| Polyol component: | |
|---|---|
| Polyol I | 79.33 parts by wt. |
| Polyol II | 10.00 parts by wt. |
| Butanediol-1,4 | 10.00 parts by wt. |
| Triethylenediamine | 0.3 parts by wt. |
| Dibutyltin dilaurate (DBTL) | 0.03 parts by wt. |
| Water | 0.35 parts by wt. |

-continued

| Polyisocyanate component: | |
| --- | --- |
| Polyisocyanate II | 64 parts by wt. |
| Properties: | |
| Density | 550 kg/m³ |
| Longitudinal shrinkage after 2 days | 0.5 |
| Hardness (Shore A) | 58 |
| Flow behavior | good |

For shoe soles blown with water, the shrinkage behavior is massively different, so that in the case of industrial utilization, all the molds would have to be replaced.

EXAMPLE 3

The surprisingly problem-free flow into a complicated steering wheel mold and the rapid decrease in pressure in the molded part, characterized by slight shrinkage immediately after demolding is shown in Example 3 (in accordance with the invention). The following Example 4 (comparison) shows the high post-expansion of molded parts due to water cross-linkage.

When performing both examples, the expandable mixture was processed using a conventional high-pressure mixing unit. The amount of expandable mixture was selected in such a way that densities of 450 kg/m³ were produced each time. The mold temperature was 45° C. in each case, and the raw material temperature was 25° C. in each case.

The internal walls of the mold were coated with a commercial mold release agent in each case (e.g. ®Acmosil 36–3603, Acmos D 28199 Bremen). The molding time was 3 min. in each case.

The following formulation was used:

| Polyol component: | |
| --- | --- |
| Polyol III | 75 parts by wt. |
| Polyol IV | 12 parts by wt. |
| Ethylene glycol | 5 parts by wt. |
| Bis-(dimethylamino-n-propyl)-amine | 0.5 parts by wt. |
| N,N,N',N'-tetramethylhexamethylene-diamine | 0.5 parts by wt. |
| Carbamate I | 2.5 parts by wt. |
| Black paste N from Bayer AG | 5.0 parts by wt. |
| Polyisocyanate component: | |
| Polyisocyanate III | 50.0 parts by wt. |

A) Steering wheel mold: Density: 450 kg/m³

After 3 min, a molded pad with optimally designed contours could be removed. Color distribution and surface structure were perfect.

B) Sheet mold:

To determine the shrinkage, the mixture was also processed in a sheet mold made from steel having the dimensions 300×236×10 mm³.

Molding time: 3 min
Shrinkage immediately after demolding: 0.5%
Shrinkage after 2 days: 1.3%

EXAMPLE 4 (COMPARISON FOR EXAMPLE 3)

The following formulation was used:

| Polyol component: | |
| --- | --- |
| Polyol III | 75.0 parts by wt. |
| Polyol IV | 12.0 parts by wt. |
| Ethylene glycol | 6.0 parts by wt. |
| Water | 0.8 parts by wt. |
| Bis-(dimethylamino-n-propyl)-amine | 1.2 parts by wt. |
| N,N,N',N'-Tetramethylhexamethylene diamine | 0.2 parts by wt. |
| Black paste N from Bayer AG | 5.0 parts by wt. |
| Polyisocyanate component: | |
| Polyisocyanate III | 51 parts by wt. |

A) Steering wheel mold:

A molded part was obtained which was highly post-expanded. As a result of this, the separating edge of the mold was reproduced on the surface of the molded part.

B) Sheet mold:

Immediately after demolding, the molded item had already expanded by 8%.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the chlorofluorocarbon-free production of cellular polyurethane molded parts having solid surfaces by reacting a reaction mixture in a sealed mold, allowing the reaction mixture to fully react, and removing the molded pad from the mold, wherein said reaction mixture comprises:

A) a polyisocyanate component having an isocyanate content of 18 to 33.6% comprising at least one polyisocyanate from the diphenylmethane series, or mixtures thereof, B) a polyol component having an average hydroxyl functionality of 2 to 3, and comprising at least one polyether polyol having a molecular weight of 2,000 to 10,000 and/or at least one polyester polyol having a molecular weight of 2,000 to 10,000, C) from 2 to 15% by weight, based on the weight of component B), of at least one difunctional compound having a molecular weight of 62 to 1999, and D) blowing agents and other auxiliary substances and additives, wherein said blowing agents comprise one or more carbamates wherein said carbamates are selected from the group consisting of carbamates corresponding to the general formula:

$$HO-(C)_n-\overset{R^2}{\underset{R^3}{\overset{|}{C}}}-\overset{R^1}{\underset{H}{\overset{|}{N^{\oplus}}}}-H \quad \overset{\ominus}{O}-CO-\overset{R^1}{\underset{}{\overset{|}{N}}}-\overset{R^2}{\underset{R^3}{\overset{|}{(C)_n}}}-OH$$

wherein:

$R^1$ represents hydrogen, or a $C_1$–$C_5$ alkyl group or a group of the formula:

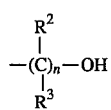

R² and R³ may represent identical or different groups, and represent hydrogen or $C_1$–$C_3$ alkyl groups, and n is an integer from 2 to 6.

2. The process of claim 1, wherein said polyisocyanate component comprises at least one chemically modified polyisocyanate from the diphenylmethane series, or mixtures thereof.

3. The process of claim 1, wherein said blowing agents comprise a combination of said carbamates and other halogen-free blowing agents.

4. The process of claim 1, wherein said carbamate corresponds to said general formula set forth in claim 1 wherein:

$R^1$ represents hydrogen, a methyl group, or a group of the formula:

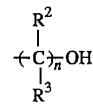

$R^2$ represents hydrogen, $R^3$ represents hydrogen or a methyl group, and n represents 2, or if $R^2=R^3=H$, then n represents 3.

5. The process of claim 1, wherein said carbamates are present in an amount of 0.1 to 6 wt. %, based on the weight of component B).

* * * * *